(12) United States Patent
Mittelstaedt

(10) Patent No.: US 12,135,690 B2
(45) Date of Patent: Nov. 5, 2024

(54) METHOD FOR PROCESSING A SYSTEM IMAGE

(71) Applicant: Robert Bosch GmbH, Stuttgart (DE)

(72) Inventor: Thomas Mittelstaedt, Bad Salzdetfurth (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/843,499

(22) Filed: Jun. 17, 2022

(65) Prior Publication Data

US 2022/0405242 A1 Dec. 22, 2022

(30) Foreign Application Priority Data

Jun. 22, 2021 (DE) ...................... 10 2021 206 374.8

(51) Int. Cl.
*G06F 17/00* (2019.01)
*G06F 8/65* (2018.01)
*G06F 16/16* (2019.01)

(52) U.S. Cl.
CPC .............. *G06F 16/162* (2019.01); *G06F 8/65* (2013.01)

(58) Field of Classification Search
CPC .......... G06F 16/13; G06F 16/18; G06F 16/24; G06F 16/156; G06N 3/00; G06N 5/00; G05B 13/00
See application file for complete search history.

(56) References Cited

U.S. PATENT DOCUMENTS

| | | | | |
|---|---|---|---|---|
| 7,747,627 | B1* | 6/2010 | Shetty | G06F 16/172 |
| | | | | 711/100 |
| 9,032,199 | B1* | 5/2015 | Dibble | G06F 11/1438 |
| | | | | 713/1 |
| 9,569,446 | B1* | 2/2017 | Feathergill | G06F 16/128 |
| 11,210,269 | B2* | 12/2021 | Scrivano | G06F 3/0608 |
| 2005/0165796 | A1* | 7/2005 | Moore | G06F 16/51 |
| | | | | 707/E17.031 |
| 2011/0307657 | A1* | 12/2011 | Timashev | G06F 11/1464 |
| | | | | 711/E12.001 |
| 2017/0109239 | A1* | 4/2017 | Gostev | G06F 11/1451 |
| 2019/0251190 | A1* | 8/2019 | Scrivano | G06F 16/162 |
| 2021/0149685 | A1* | 5/2021 | Reinders | G06F 9/44505 |
| 2022/0327082 | A1* | 10/2022 | Jeon | G06F 13/4045 |

OTHER PUBLICATIONS

Do et al, "Modeling the Linux page cache for accurate simulation of data-intensive applications", Jan. 5, 2021.*

* cited by examiner

*Primary Examiner* — Hung D Le
(74) *Attorney, Agent, or Firm* — NORTON ROSE FULBRIGHT US LLP; Gerard A. Messina

(57) ABSTRACT

A method for processing a system image, which represents an image of a file system. Each file in the file system is assigned an attribute, this attribute representing a last access time to this file, Initially the attributes of all files are set to a predefined value. The system image is executed, and then all attributes being checked. Finally the files are deleted whose attribute has the preset value.

9 Claims, 2 Drawing Sheets

METHOD FOR PROCESSING A SYSTEM IMAGE

CROSS REFERENCE

The present application claims the benefit under 35 U.S.C. § 119 of German Patent Application No. DE 10 2021 206 374.8 filed on Jun. 22, 2021, which is expressly incorporated herein by reference in its entirety.

FIELD

The present invention relates to a method for processing a system image and an arrangement for carrying out the method. The present invention furthermore relates to a computer program and a machine-readable memory medium.

BACKGROUND INFORMATION

A system image, also referred to as an image, is to be understood as the image of a file system in a file. All data or files of the imaged file system are then typically contained in this file.

System images or images for Linux systems are presently implemented by the installation of software packages. It is to be noted here that these installation packages are larger in most cases, i.e., include more files, than is necessary for the device function. In addition, it is to be taken into consideration that packages are additionally installed indirectly by dependencies from specified packages.

This results in system installations which are larger than is required for the function of the device. Presently, the system images are optimized by manual postprocessing by specialists, during which unnecessary files are identified, or by custom-tailored installation packages. However, these are not able to be applied in a scalable manner. Larger memory modules are necessary due to the increased memory space requirement, which may significantly increase the costs of the device, in particular in the case of low material costs. Reference is made in this context to point 1 in the figures.

SUMMARY

In accordance with the present invention, a method and an arrangement for processing a system image are provided. Furthermore, a computer program and a machine-readable memory medium are provided in accordance with the present invention. Specific embodiments of the present invention result from the disclosure herein.

The method of the present invention is used for processing a system image which represents an image of a file system. In accordance with an example embodiment of the present invention, each file in the file system is assigned an attribute, this attribute representing a last access time to this file. Initially the attributes of all files are set to a predefined value and the system image is executed. All attributes are then checked. Finally, the files are deleted whose attribute has the preset value.

The arrangement in accordance with the present invention is used for carrying out the the method of the present invention and is implemented, for example, in hardware and/or software. The computer program of the present invention includes program code for carrying out the method of the present invention and may be stored on a machine-readable memory medium.

Using the method of the present invention, the size of the system images, which are also referred to as system installations, may be reduced effectively and automatically, so that the required memory is used effectively. If it is possible in this way to use smaller memory modules, the device costs may be reduced without restricting the functionality. In addition, suggestions for the optimization of the system installation for the development may be obtained.

The method of the present invention is based on the marking of all files which come into consideration as a deletion candidate in a system installation, and the property of the operating system or the processor to remove this marking again upon access. For this purpose, in one design, in a test system without further hardware, the system image is prepared, all desired functions are executed, and then the system is searched for unused files. These are deleted. This setting may be applied later to other system installations already during the creation without using a test system again. It is therefore not necessary to connect additional test hardware, for example, additional memory or special debugging hardware.

A function, namely the last access time, of modern file systems in particular is thus utilized to determine which files are used.

Alternatively, an implementation using hardware expansions or special file system properties may also achieve the same effect.

The same effect may also be achieved using a memory system and memory areas and possibly a hardware expansion instead of a file system and files.

Further advantages and designs of the present invention result from the description and the figures.

The above-mentioned features and the features still to be explained hereinafter are usable not only in the particular specified combination but also in other combinations or alone without departing from the scope of the present invention.

DETAILED DESCRIPTION OF EXAMPLE EMBODIMENTS

The present invention is schematically shown on the basis of specific embodiments in the figures and is described in greater detail hereinafter with reference to the figures.

In the figures, numbers 1 through 10 are shown bordered, which will be discussed hereinafter as identifying points.

Figure 1:
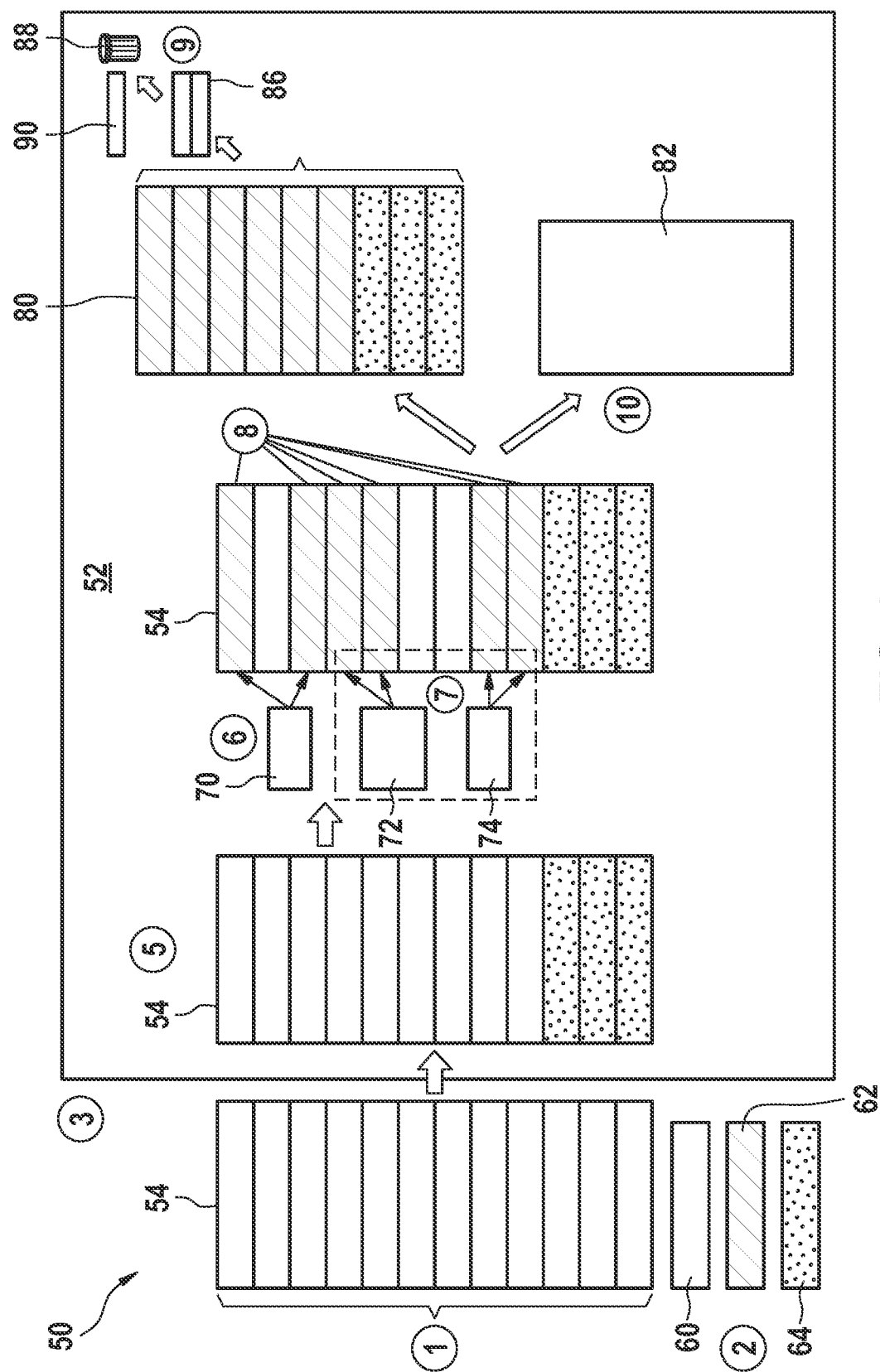
FIG. 1 shows a diagram of a test system and target hardware to illustrate one specific example embodiment of the method of the present invention.

FIG. 1 shows a diagram of a test system 50 and a target system 52. In the test system, at point 1, a system installation or a system image 54 having size X is shown, which includes the following files:

/Path1/File11
/Path1/File12
/Path1/File13
/Path2/File21
/Path2/File22
/Path2/File23
/Path3/File31
/Path3/File32
/Path3/File33

/Path4/File41
/Path4/File42
/Path4/File43

Furthermore, under point 2 the following are indicated: an empty field 60, which denotes a file which is not accessed, a dashed field 62, which denotes a file which is accessed, and a dotted field 64, which denotes a file which is excluded. The further fields in this representation are shown accordingly.

Furthermore, under point 5 in target system 52, system image 54 is shown including the above-mentioned files, these being identified accordingly under the specification according to point 2. Under point 6, a field is denoted by reference numeral 70, which reflects an application APP1. Under point 7, a daemon 72, and thus a process which runs in the background, and a boot process 74 are indicated.

Point 8 marks the files of system image 54 which are accessed. A reduced system image 80 results and under point 10 a list 82 of files which are accessed and which are excluded. The size of this reduced system image 80 is Y, Y<X applying.

Files which are accessed are in this case:
/Path1/File11
/Path1/File13
/Path2/File21
/Path2/File22
/Path3/File32
/Path3/File33
Files which are excluded are:
/Path4/File41
/Path4/File42
/Path4/File43
Under point 9, a list 86 is shown which includes:
/Path2/File23
/Path3/File31
File 90/Path1/File 12 is put in a trashcan 88.

FIG. 2 again shows system image 54 and a simulated system 100. Identical reference numerals show identical components or units here.

In modern file systems for Linux, for example, ext4, btrfs, an attribute "Access time" (atime) exists, namely a numeric value which represents the last access time to this file. This attribute is set to 0, this corresponds to 1.1.1970, thus the status to UNACCESSED. This means that the file is not used. When in the later course of things any program accesses a file, the operating system sets the attribute to the time of the last access, not equal to 0. For the sequence, a value not equal to 0 is interpreted as ACCESSED, i.e., the file is used. Reference is made to point 2 in the drawings.

With a nonfunctional attribute, the sequence does not function.

The sequence is executed in the same way in two environments

On the target hardware having a test system, see point 3 in FIG. 1, more data may be measured, these are used as the configuration for the next environment.

Figure 2:
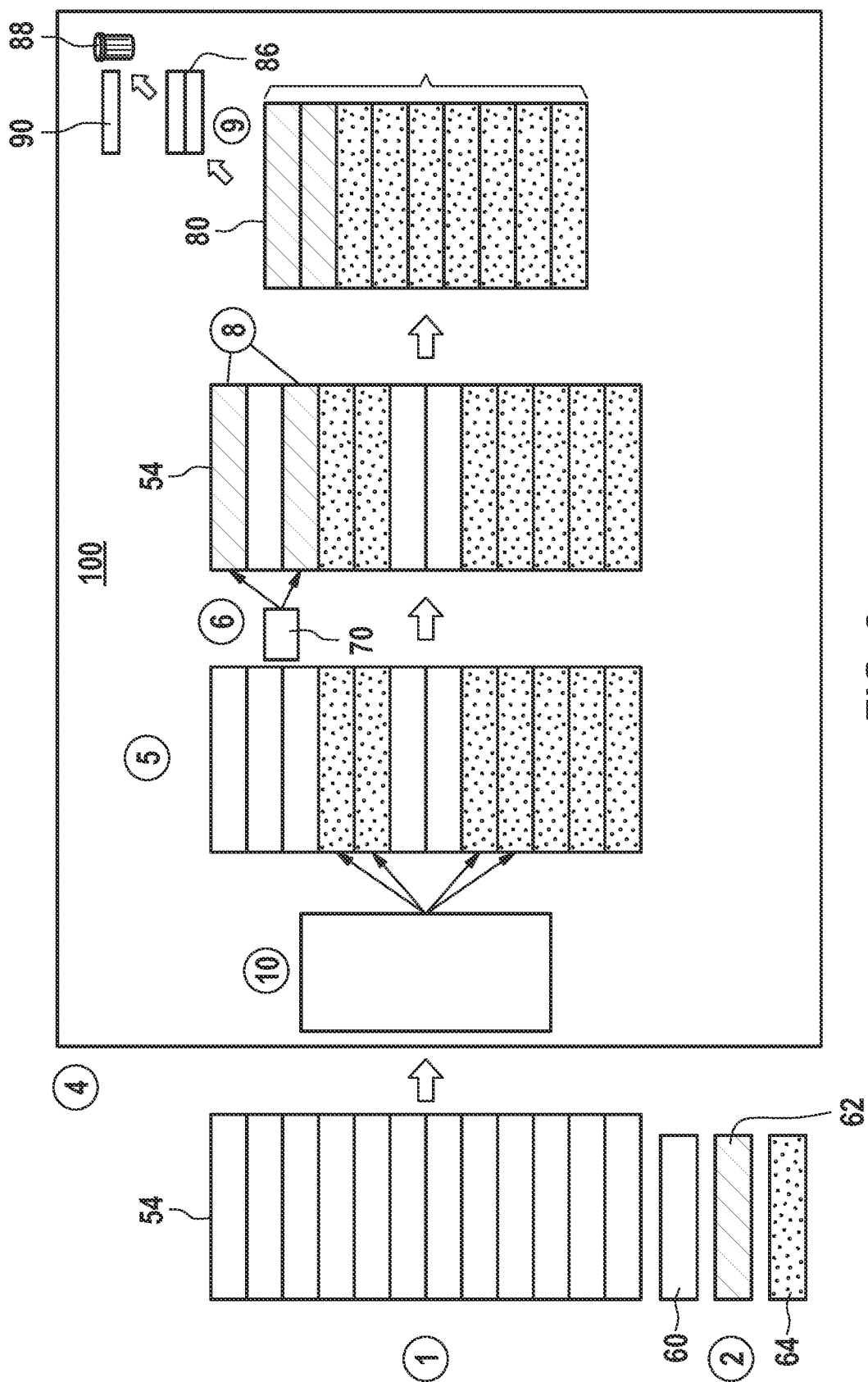
FIG. 2 shows a diagram of a creation of a system image in accordance with the present invention.

In the case of the creation of new system installations, in the drawings point 4 in FIG. 2, on a simulated hardware, i.e., the use of chroot, qemu-user-static, less data may be measured. Due to the structural similarity to the test system, data from the test system are used on the target hardware.

chroot is a Linux program for temporarily switching to a new root file system. Therefore, a directory under the path "<path>", as, for example, /dir1/dir2/dir3 is switched over so that it appears as "/" including all contents. Thus, for example, it becomes:

/dir1/dir2/dir3→/
/dir1/dir2/dir3/dir4→/dir4
/dir1/dir2/dir3/dir5/file1→/dir5/file1

This is used to switch over temporarily to other systems and execute commands on these systems and change data. It is thus a type of simulation of the switched-over system without booting and hardware.

quemuc-user-static is a package of Linux programs which additionally permit it to execute programs for other process architectures. It thus emulates a foreign-architecture processor. It is thus possible to execute on a PC having x86 architecture for example, ARM programs, although significantly slower.

Both programs enable images of target systems to be executed on PC development systems, although without a boot process. There are further technologies to also execute the boot process in approximation on a simulation and a processor emulation. However, these are never completely identical to an actual hardware system.

The sequence is made up of three phases and is executed on both environments with small differences:

1. All files of the system image or the system installation are set to UNACCESSED, i.e., file is not used. System directories or system files and user-defined directories or files are excluded, which are not to be handled by the procedure, see point 5 in the figures.

2. Functions are now executed on the system which represent the function of the product. The system accesses files or programs which in turn carry out further file accesses. In all file accesses, these files are set to ACCESSED, see point 8 in the figures. Since the measurement system operates completely transparently, this test phase on the target hardware may also take place decentrally in the course of a system test.

2.1 On the target hardware including a test system, see point 3 in the figures, the following is executed or taken into consideration:

Direct call of programs or apps, see point 6 in the figures, start of background services, i.e., daemons or services, see point 7 in the figures, Startup and shutdown of the system, see point 7 in the figures, Loading of kernel modules for the target hardware, see point 7 in the figures, Execution of hardware-level drivers, see point 7 in the figures.

2.2 In the case of the creation of new system installations, see point 4 in the figures, on simulated hardware, the following is executed or taken into consideration:

Direct call of programs or apps, see point 6 in the figures,

Usage of data from the test system on the target hardware, see point 10 in the figures.

3. As the final step, all files which are still set to UNACCESSED are deleted, see point 9 in the figures. The information about all used files is stored as the configuration, see point 10 in the figures.

The presented method of the present invention may in principle be used on all Linux systems. If other operating systems such as Windows, QNX have comparable file system attributes, the use there is also possible.

In particular small product installations, for example, IOT devices having defined functional scope, profit most from the presented method.

IOT devices (IOT: Internet of things) are small devices of daily use, for example, washing machines, tools, hot plates, domestic technologies such as lamps, etc., which are equipped with an Internet connection, but the main usage of which takes place via the device. The Internet connection provides additional benefits for the customers such as:
- switch lamps from smart phone on/off,
- check level and reorder coffee via a fully automatic machine,
- check whether the stove is still on,
- have the washing machine run when the power is inexpensive.

IOT devices are typical devices which are also represented in the digital world via the Internet connection and to which additional functions, which are useful to the customer, are assigned or may be assigned in this way. These functions may be, for example, remote control and remote diagnosis functions.

What is claimed is:

1. A method for processing a system image which represents an image of a file system, the method comprising the following steps:
   assigning, by a processing unit, each file in the file system an attribute, the attribute representing a last access time to the file, initially the attributes of all files being set to a predefined value;
   executing, by the processing unit, the system image; and
   after executing the system image, checking, by the processing unit, the attributes of the files, and deleting those of the files whose attribute has the predefined value, wherein the predefined value represents that the associated file was unaccessed during executing the system image.

2. The method as recited in claim 1, wherein the file system is a Linux file system, and wherein an attribute access time is used as the attribute, to which a numeric value is assigned, which represents a last access time to the file.

3. The method as recited in claim 1, wherein the attribute is set to the value 0.

4. The method as recited in claim 1, wherein further conditions are checked before deleting the files.

5. The method as recited in claim 1, wherein the steps of the method are carried out upon an update of the system image.

6. The method as recited in claim 1, wherein the steps of the are carried out at regular intervals.

7. The method as recited in claim 1, in which a preselection of the files is carried out whose attribute is checked.

8. An arrangement for processing by a processing unit a system image which represents an image of a file system, the arrangement configured to:
   assign, by the processing unit, each file in the file system an attribute, the attribute representing a last access time to the file, initially the attributes of all files being set to a predefined value;
   execute, by the processing unit, the system image; and
   after executing the system image, check, by the processing unit, the attributes of the files, and deleting those of the files whose attribute has the predefined value, wherein the predefined value represents that the associated file was unaccessed during executing the system image.

9. A non-transitory machine-readable memory medium in which is stored a computer program for processing a system image which represents an image of a file system, the computer image, when executed by a processing unit, causing the processing unti to perform the following steps:
   assigning each file in the file system an attribute, the attribute representing a last access time to the file, initially the attributes of all files being set to a predefined value;
   executing the system image; and
   after executing the system image, checking the attributes of the files, and deleting those of the files whose attribute has the predefined value, wherein the predefined value represents that the associated file was unaccessed during executing the system image.

* * * * *